US005721462A

United States Patent [19]

Shanks

[11] Patent Number: 5,721,462

[45] Date of Patent: Feb. 24, 1998

[54] NUCLEAR BATTERY

[75] Inventor: Howard R. Shanks, Ames, Iowa

[73] Assignee: Iowa State University Research Foundation, Inc., Ames, Iowa

[21] Appl. No.: 148,353

[22] Filed: Nov. 8, 1993

[51] Int. Cl.$^{6}$ .............................. G21H 1/00; G21H 1/12; C09K 11/04

[52] U.S. Cl. .............................. 310/303; 429/5; 136/253; 136/258

[58] Field of Search .............................. 310/303; 429/5; 136/253, 254, 258

[56] References Cited

U.S. PATENT DOCUMENTS

| | | | |
|---|---|---|---|
| 3,031,519 | 4/1962 | Silverman | 136/89 |
| 3,037,067 | 5/1962 | Bartolmei | 136/89 |
| 3,053,927 | 9/1962 | Viszlocky | 136/89 |
| 3,344,289 | 9/1967 | Knight | 310/3 |
| 3,483,040 | 12/1969 | Parkins | 136/89 |
| 4,242,147 | 12/1980 | DeToia | 136/253 |
| 4,636,579 | 1/1987 | Hanak et al. | 136/245 |
| 5,082,505 | 1/1992 | Cota et al. | 136/253 |
| 5,118,951 | 6/1992 | Kherani et al. | 313/54 |
| 5,124,610 | 6/1992 | Conley et al. | 310/303 |
| 5,240,647 | 8/1993 | Ashley et al. | 252/646 |
| 5,280,213 | 1/1994 | Day | 310/304 |
| 5,313,485 | 5/1994 | Hamil et al. | 372/69 |
| 5,435,937 | 7/1995 | Bell et al. | 252/301.18 |
| 5,443,657 | 8/1995 | Rivenburg et al. | 136/253 |

OTHER PUBLICATIONS

Walko et al, IBCEC—91, pp. 135–140, vol. 6, abst. only herewith.

Walko et al, IBCB—26th Conf., Aug. 3, 1991, WTIS DB 910 14666/XAB, pp. 1–26; abst. herewith.

*Primary Examiner*—Nelson Moskowitz
*Attorney, Agent, or Firm*—Leydig, Voit & Mayer, Ltd.

[57] ABSTRACT

A nuclear battery for supplying low level electrical energy for a relatively long period of time. The battery includes a low-energy beta emitter and phosphor dispersed sufficient proximate the beta emitter to capture the low energy betas before decay. A photovoltaic receptor is configured to have a peaked response near the wavelength of the photons emitted by the phosphor. In a preferred embodiment, the photovoltaic, phosphor and beta source are formed into flexible layers which are rolled into a cylinder in order to maximize the capture of photons emitted by the beta-excited phosphor.

2 Claims, 3 Drawing Sheets

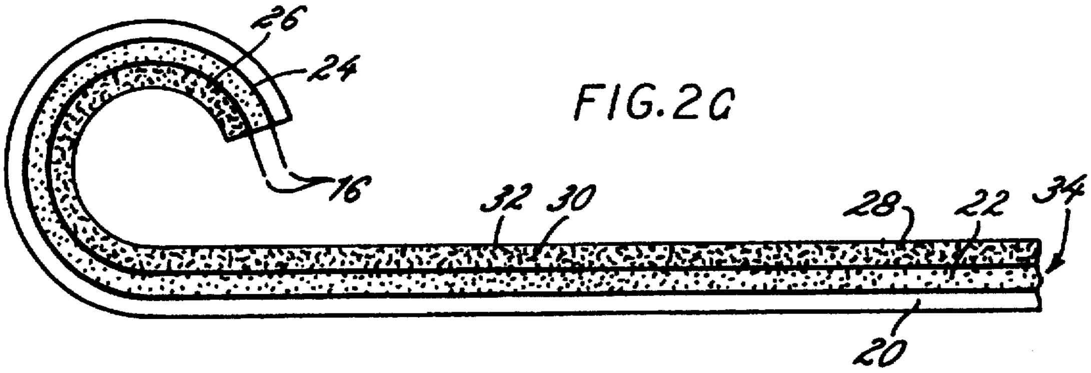
FIG.2c
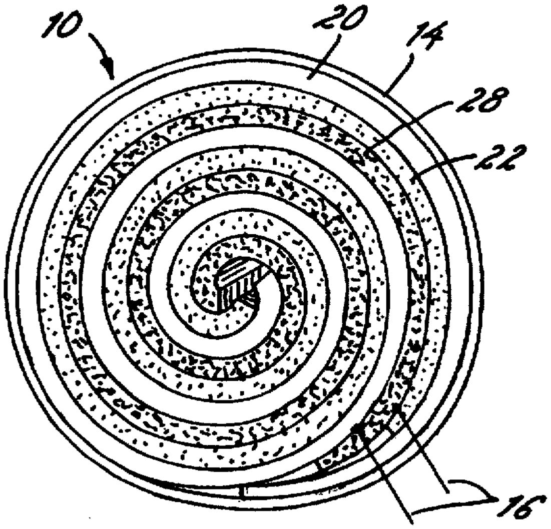
FIG.2d
FIG.3
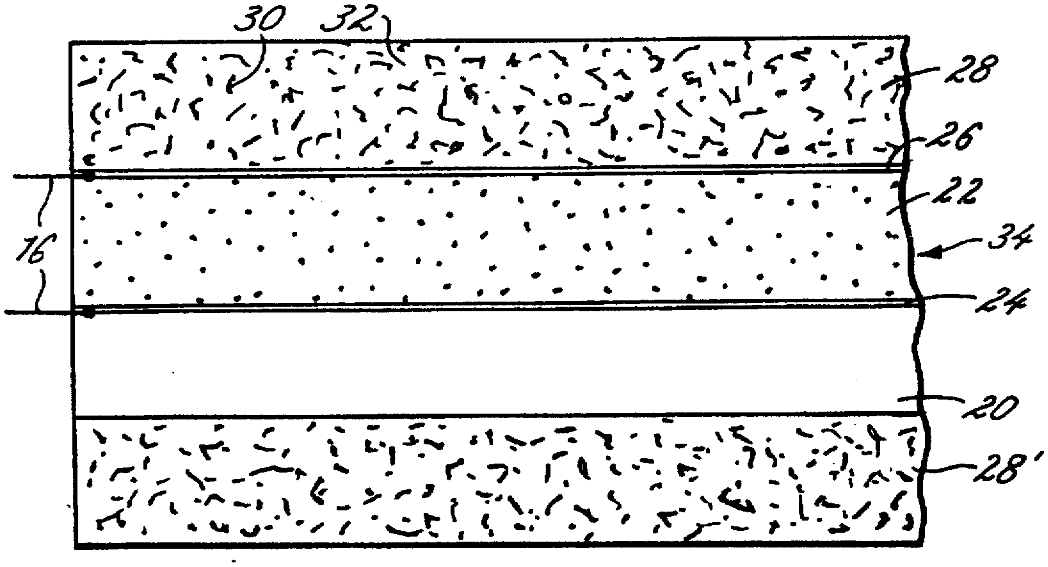

NUCLEAR BATTERY

FIELD OF THE INVENTION

The present invent ion relates to self-contained power cells capable of supplying electrical energy, and more particularly to a compact battery capable of supplying a low level of energy for a relatively long period of time.

BACKGROUND OF THE INVENTION

Electric power cells provide self-contained sources of electrical energy for driving external loads. Chemical batteries are a common example of a practical electric power cells, in that they are relatively inexpensive to produce and capable of supplying a reasonably high energy output, even though it may be for a relatively short period of time. These batteries are effectively employed in a large variety of applications and environments, which can range in requirements from a very large current demand over a short period of time, such as a heavy-duty fork lift truck, to a small current demand over a long period of time, such as a small wristwatch. While chemical batteries are very effective at providing the power needs of such devices, the size and durational requirements sometimes associated with microelectronic devices are not always compatible with employment of chemical batteries. One example of a microelectronic device possibly requiring a compact, long-life, low-current battery is a nonvolatile memory circuit of a compact computing device. Another example is a low power electronic sensor which is installed for long term unattended operation in an inaccessible location.

The amount of electrical energy supplied by chemical batteries is directly related to the mass of reactive materials incorporated in the chemical batteries. This characteristic can result in the size of a chemical battery being much larger than its load. Even a chemical battery in a modern electronic wristwatch is usually much larger in size and heavier relative to the electronic microchip circuitry which drives the watch. It is therefore desirable to provide an extremely compact battery that can fit in a very small space, and preferably one which can also provide many years of uninterrupted service.

Nuclear batteries have been proposed in the literature. To the extent such nuclear batteries have been commercially available, it is not seen that they have made substantial inroads into applications being served by chemical batteries. A number of reasons can be identified for the limited acceptance of nuclear batteries, and they include the inefficiency of batteries, and the need to shield the user from the nuclear source which generates the electrical energy. Thus, to meet a given energy demand, the inefficiency of the battery would first require a sufficient mass and size to achieve the necessary usable output, and the shielding necessitated by high energy nuclear sources would further exacerbate the size problem.

The energy conversion mechanism underlying the operation of many nuclear battery proposals is the dual conversions process, which typically includes a radioactive source, a phosphor and a photocell. The radioactive source emits nuclear radiation, often beta particles, which impact the phosphor and generate photons. In turn the generated photons impinge upon the photocell and produce electron/hole pairs, which are collected as a source of electrical energy for driving an external load.

In order to obtain a useful level of electrical energy from such battery, the utilization of high energy sources, often high energy beta sources, is typically recommended. Since the dual-conversion process is not very efficient and the power output per unit area of a photocell is typically not very large, the practice has been to recommend high energy radioactive sources, such as betas having an energy level substantially greater than 20 keV (kilo-electron volts).

Use of high energy sources to produce useful electrical output goes hand-in-hand with its own array of problems. First of all is the requirement for shielding of humans, both those involved in manufacturing the battery, and those who might come in contact with the battery during its useful lifetime. Meeting the latter requirement typically includes use of expensive lead or foil shields of a thickness capable of stopping the high energy particles. The former problem requires the use of protective clothing or shielding for those involved in assembling the battery. Disposal can be a problem for devices using relatively high energy radioactive sources. A final incidental problem associated with high energy sources is, of course, the known fact that such high energy sources, particularly over time, can damage the photocell, which further reduces efficiency.

SUMMARY OF THE INVENTION

In view of the foregoing, it is a general aim of the present invention to provide a highly efficient, compact energy source capable of powering a low-current device for a relatively long period of time.

More specifically, it is an object of the present invention to provide a nuclear battery that utilizes a low-energy radioactive source, but still provides output energy at a useful level.

Another object of the present invention is to provide a nuclear battery that can be handled safely and is therefore less costly to produce.

A further object of the present invention is to increase the efficiency of a nuclear battery employing a low-energy beta emitter.

In accordance with one aspect of the invention, there is provided a compact battery for supplying a low level of electrical energy for a relatively long period of time. The battery includes a low-energy beta emitter and a phosphor, positioned with respect to each other so that the emitted low-energy beta particles have sufficient energy to impinge upon the phosphor before decay and thus generate photons. A photovoltaic is constructed to have an absorption characteristic which, is peaked at the emission wavelength of the phosphor, and is positioned relative to the phosphor to collect the emitted photons and convert them into electrical energy.

In a presently preferred embodiment, the photovoltaic, phosphor and beta emitter are formed in flexible layers on a dimensionally stable flexible substrate, and are coiled into a cylinder in order to maximize the capture efficiency of generated photons.

In one particular implementation of the invention the battery is formed directly on the surface of the substrate of a microelectronic circuit in order to provide a self-powered, long-lasting microelectronic circuit.

Other objects and advantages will become apparent from the following detailed description when taken in conjunction with the drawings.

BRIEF DESCRIPTION OF THE DRAWINGS

FIGS. 2*a*–2*d* sequentially illustrate the steps of fabricating the embodiment of FIG. 1;

FIG. 3 is a view similar to FIG. 2*b* illustrating a further embodiment of the present invention with photon generating elements on both sides of the photovoltaic;

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DETAILED DESCRIPTION OF THE PREFERRED EMBODIMENTS

Figure 1:
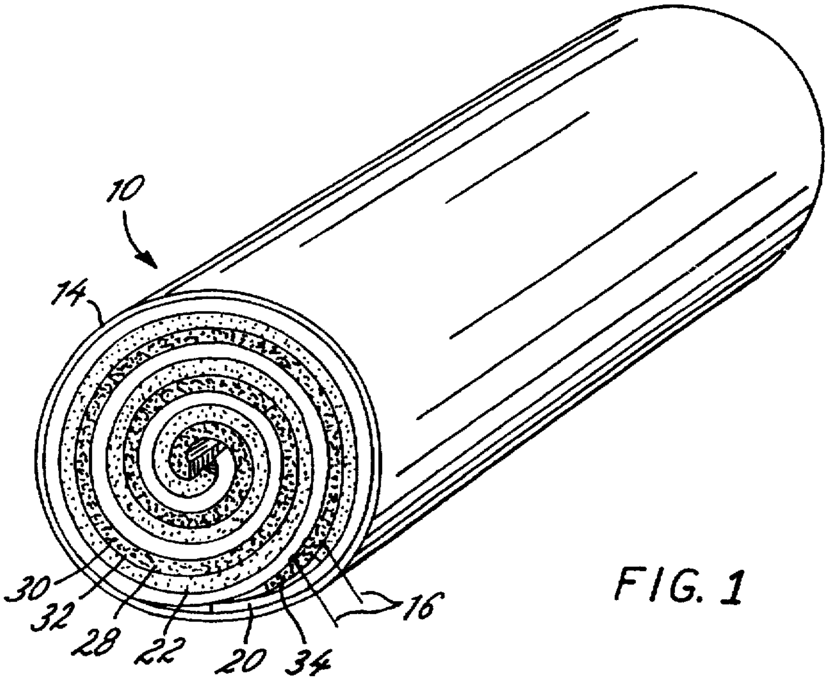
FIG. 1 is a perspective view of a nuclear battery exemplifying a preferred embodiment of the present invention and illustrating the battery elements formed in flexible layers which are tightly coiled into a cylinder.

Turning now to the drawings, FIG. 1 illustrates a dual-conversion nuclear battery 10 configured in accordance with the preferred embodiment of the present invention. The battery 10 includes a photovoltaic 34, a phosphor 32, and a beta source 30 that are formed into flexible layers which are tightly coiled into a cylinder. The radioactive source 30 emits low-energy beta particles, and the phosphor 32 captures the betas and emits photons as a result thereof. The photons in turn are captured by the photovoltaic 34 which produces the electrical output. The battery 10 is enclosed within an outer sheath 14 that serves to protect and contain the contents of the battery 10. The sheath 14 can be a cover of paper or synthetic film, but can be eliminated in certain applications, if desired. It will be appreciated that the sheath serves mainly as a packaging element and thus need take no significant space, in contrast to radiation shields of the prior art which required use of metallic shielding material of a thickness sufficient to absorb all stray radiation emitted by the internal radioactive source.

Beta source 30 and phosphor 32 are given separate reference numerals in the figures, although the scale of the drawing does not allow for accurate representation of the different components. The manner in which the phosphor and beta source components are associated with each other and with the photovoltaic will be better described below. Suffice it for the moment to understand that one of the layers of the FIG. 1 illustration includes both such elements.

With respect to drawing scale, it will also be appreciated that the drawings, particularly those showing a rolled configuration, are not in an actual scale, but in a scale selected to best illustrate the invention. More particularly, the respective layers which make up the battery of FIG. 1 are on the order of a millimeter or less in thickness, and thus a cylindrical battery of a given real diameter will usually contain many more layers than are shown in the drawings. The drawings are intended primarily to illustrate the relationship between the respective layers, and not the number of layers which will make up a practical battery.

As will be described in greater detail below, the photovoltaic layer 34 has a pair of electrodes associated therewith, and leads 16 connected to the electrodes. The leads 16 are adapted for connection to an external load for conveying the power generated by the cell to the load. It is noted at this point that the term "photovoltaic" is used in connection with the layer 34 in order to distinguish it from the conventional photocell; the intent of the use of the more restrictive term photovoltaic is to refer to a optoelectric conversion means having a characteristic peaked at the wavelength of the phosphor rather than the broad spectrum of a standard photocell.

The leads 16, as noted above, serve for connection of the cell to the load. A plurality of cells 10 can be formed separately or on the same substrate, and can be interconnected in series or in parallel to derive the necessary voltage and current capacities to meet the requirements of a particular load.

FIGS. 2*a*–2*d* provide a sequential illustration of the formation of a preferred embodiment of the battery 10; these figures also allow for a detailed description of the components which make up the battery. Beginning with FIG. 2*a*, the battery 10 is preferably based on a flexible substrate 20 which maintains dimensional stability for the battery components which overlay it, but allows flexibility in order to form the battery 10 into its preferred rolled configuration. In many applications, it is desirable to utilize a substrate 20 that is transparent at the wavelengths employed in the battery. The substrate 20 can be formed from various materials, but is preferably formed from a transparent, dimensionally stable, flexible synthetic film, such as a polyimide. One type of useful polyimide for this application is that sold under the trademark Kapton by the DuPont Company.

In keeping with the invention, a flexible energy conversion layer is formed on dimensionally stable substrate 20; in the illustrated embodiment the energy conversion layer comprises the aforementioned photovoltaic layer 34. The energy conversion accomplished by the photovoltaic layer 34 is to capture photons (which are generated by the first stage energy conversion layer or light source to be described below) and to convert the energy from the captured photons into electrical energy available to an external circuit at the device leads 16. In the preferred practice of the invention, in order to accommodate the flexibility needed to produce the rolled configuration, the photovoltaic layer 34 includes a poly-crystalline semiconductor material such as hydrogenated (or amorphous) silicon.

Figure 2A:
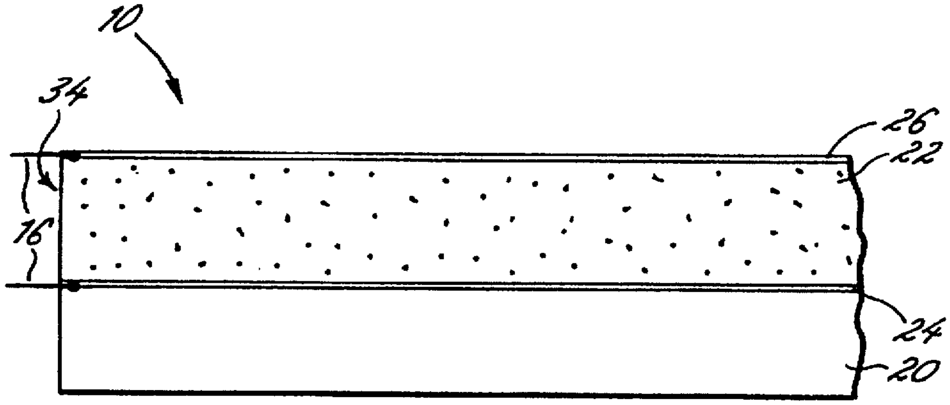

Referring in greater detail to FIG. 2*a*, the photovoltaic layer 34 includes a pair of electrodes 24, 26 sandwiching an intermediate semiconductor material 22. At least one of the electrodes, in the illustrated embodiment the upper electrode 26, is transparent at the wavelength of the photons being passed through that electrode. In the case where the photovoltaic layer 34 is intended to receive photons on both sides, both electrodes 24 and 26 will be transparent at the operating wavelength.

In order to fabricate the device as illustrated in FIG. 2*a*, a first electrode 24 is formed by depositing a conductive metal layer on the upper surface of the substrate 20. Conventional deposition techniques, such as sputtering or chemical vapor deposition are utilized. In the case where the lower electrode 24 is intended to be transparent, a transparent material such as that to be described in connection with electrode 26 will be utilized. Where transparency of the electrode 24 is not important, an aluminum thin film is preferred. The thin film layer 24 can be extended to produce one of the leads 16, or alternatively a wire can be bonded to the layer in a manner dictated by the mechanical configuration of the battery.

Having deposited the first electrode 24, the semiconductor layer 22 is then deposited on the electrode. As noted above, amorphous silicon is preferred, because the non-crystalline nature thereof allows the finished device to be rolled into its preferred cylindrical shape. It will be appreciated that if crystalline material were utilized, there would be no opportunity for altering the physical shape of the device without destroying the crystalline semiconductor lattice.

The amorphous silicon layer is grown by conventional techniques, such as chemical vapor deposition to produce a layer of sufficient thickness (on the order of 0.5 to 1 mm) to capture photons generated in the primary layer. The amorphous silicon layer will typically be grown to produce a pin junction so that captured photons generate electron/hole pairs which are separated at the junction to provide carriers at the respective device electrodes. Thus, the amorphous silicon which is grown to form layer 22, is doped to produce the desired pin structure. The hydrogen concentration is selected to produce a spectral characteristic for the photovoltaic which is maximum at the wavelength of the light emitted by the phosphor. As is well known, the spectral characteristic of the photovoltaic can be adjusted by control of the hydrogen concentration. Preferably in practicing the invention, the optical energy gap of the photovoltaic is adjusted to be just slightly less than the wavelength at which the phosphor emits. Thus, the wavelength (or energy) of the photons will be about the same as the band gap energy of the photovoltaic such that photons will be captured without substantial energy loss. If the photons were at a wavelength equivalent to a substantially higher energy level, it would be necessary to give up substantial energy until reaching the band gap energy of the photovoltaic for capture, and that quantity of energy would not be available for conversion into output electrical power. Thus, the matching of the spectral characteristic of the photovoltaic (and the opportunity to peak that matched response at the fluorescent peak of the phosphor) provides the opportunity to maximize energy conversion in the cell, allowing the provision of useful electrical output from a relatively low energy beta source. When it is desired to peak the desired response to match the europium doped $Y_2O_3$ phosphor, the amorphous silicon semiconductor material is doped at concentrations which produce a peak response at a wavelength of about 600 nm.

Having deposited the appropriate semiconductor layer 22, as by chemical vapor deposition, FIG. 2*a* illustrates that an upper electrode 26 is then deposited. Preferably the upper electrode 26 is also deposited by chemical vapor deposition or by sputtering. Since the photons emitted by the phosphor must penetrate the electrode 26, it must be transparent at the wavelength of the photons of interest. Preferably the upper electrode 26 is a ZnO thin film. In other cases, InSnO (also sometimes referred to as ITO) can also be deposited. As noted above, in the case where the photovoltaic is intended to be photoresponsive on both sides, the lower electrode 24 is also of transparent material, and is deposited in place on the surface of the substrate 20 much as the upper electrode 26 is deposited on the upper surface of the semiconductor material 22. When the substrate material 20 which underlies the electrode 24 or the phosphor/beta source material which overlies the electrode 26 is partially conductive, use of ZnO electrodes is particularly preferred because the thickness and smoothness of those electrodes can be controlled to minimize leakage through the electrodes and thus shunt leakage through the underlying or overlying materials.

Before turning to the beta source and phosphor layers which are deposited on the photovoltaic, it will first be noted that the use of an amorphous silicon semiconductor photovoltaic element in combination with the flexible, but dimensionally stable substrate 20, provides a combination of characteristics significant to the present invention. Dimensional stability is achieved so that the device can be subjected to environmental stresses without danger of damage, such as that which might be caused by thermal expansion or contraction. The non-crystalline nature of the amorphous silicon allows the photovoltaic 22 to be flexed without damage, so that the configuration can be tightly rolled into its preferred shape.

These characteristics, of course, apply to the preferred form of the invention in which the flexibility of the substrate coupled with the amorphous nature of the photovoltaic cell allow flexing or rolling without damage to the battery. As will be noted later in the specification, certain advantages of the invention can be achieved on a rigid substrate. For example, the embodiment of FIG. 5 will be described in which a long life self-powered semiconductor is provided using certain aspects of the present invention for powering of the semiconductor, but not taking advantage of the flexibility of the substrate which is a characteristic of the preferred embodiment.

Figure 2B:
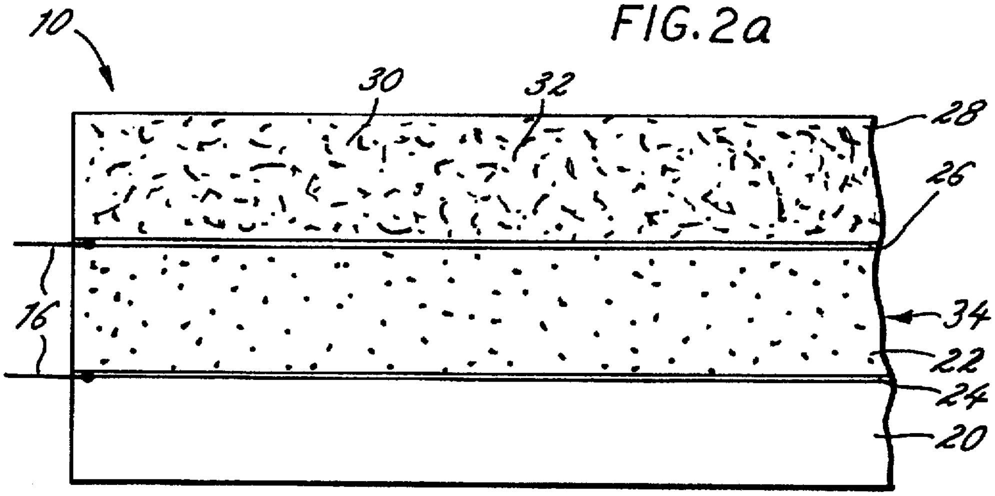

Returning to the preferred embodiment, having formed the photovoltaic layer 34 on the flexible substrate 20, in accordance with the invention, a beta source 30 and a phosphor 32 having a peaked spectral response matched to the spectral characteristic of the photovoltaic 34, are deposited over the photovoltaic 34, as shown in FIG. 2b. As noted above, there are multiple requirements placed on the photovoltaic 34, and on its association with the other components in the battery 10. Among them is the spectral response of the phosphor material which should be closely matched to that of the photovoltaic; in other words, the phosphor should fluoresce at a wavelength which corresponds fairly closely to the peak response characteristic of the photovoltaic.

A second important consideration is the association of the phosphor 32 (and associated beta source 30) with the photovoltaic 34 so as to maximize the number of generated photons which are captured in the photovoltaic and converted into an electrical current. To that end, the phosphor 32 is brought into close contact with the photovoltaic 34, and absorbing or diffracting at the interface is minimized. In the presently preferred practice of the invention, that close contact is achieved by casting the phosphor(and beta)-bearing material in a gel 28 which is applied to the flat upper surface of the photovoltaic 34. Casting allows a clearly defined interface between the photovoltaic and the phosphorbearing film. It will be appreciated that the photons have a travel distance of about 1 cm or less in the gel 28, and the casting technique uses very little of that travel distance for gaps between the gel 28 and the photovoltaic 34. A further feature related to travel distance of the photons is the thickness of the photovoltaic 34 itself. In the case where the photovoltaic is intended to receive photons from both sides, the thickness of the gel 28 should be minimized to save volume in the battery. Preferably, something a few nanometers thick is desirable.

A final important constraint applies to the phosphor 32, and the beta source 30 which excites it. More particularly, in accordance with the invention, a low-energy beta source is utilized for the reasons discussed at length above. However, the utilization of a low energy source, such as tritium which emits beta particles having an average energy level of 15–20 keV, imposes definite requirements on the allowable spacing between the beta emitter and the phosphor which it excites. More particularly, the travel distance of low-energy betas before decay is only on the order of 30 nm, and in practicing the invention the phosphor must be associated with the beta source by a distance of that or less, or the radioactive energy will not be converted to photons.

In practicing the invention, means are provided for intermixing the phosphor and the beta source, the preferred means being illustrated in FIG. 2*b* as a finely and uniformly intermixed gel layer 28 containing both the beta source 30 and the phosphor 32. Thus, the light source (the beta source and beta responsive phosphor), consists of a film of silicon dioxide based sol-gel or spin-on-glass in which at least part of the hydrogen in the water of hydration is replaced with tritium, a beta source. The phosphor is mixed directly in the sol-gel or spin-on-glass to intimately associate the two. The entire light source (gel with beta source and phosphor) is applied to the surface of the photovoltaic layer 34 as a thin film. As the light path is short, the thickness of the light source film can be only a few thousand nanometers, although in practice a thicker layer may be easier to apply and would not have a substantially negative impact on operation of the device. Such thin layers are readily rolled into the preferred cylindrical configuration without damage to the respective films which make up the layers.

In the preferred embodiment, the phosphor is a fine powder, with a fineness of less than 1 micrometer. The beta source is preferably a gel with a radioactive element, such as tritium (a radioactive isotope of hydrogen) substituted in some of the hydrogen positions of the water constituent of the gel. Thus the finely dispersed beta source is an element of the gel 28, wherein the gel 28 is adequately agitated when the gel 28 is in a liquid state to disperse the fine phosphor powder throughout the beta emitting gel. The composite gel 28 is then cast using conventional doctor blade application and curing techniques over the flexible photovoltaic 34 to a thickness of about 0.5 to 1.0 mm. Thorough mixing of the materials before casting, and the performance of the casting operation before the materials can separate, assures that the phosphor powder is associated with the gel 28 with sufficient proximity that a majority of the particles emitted by the tritium in the gel 28 are captured by the phosphor. The density of the phosphor particles should be such that a beta particle will encounter a phosphor particle before escaping the gel. If the beta mean fee path is on the order of 100 monolayers, or about 30 to 100 nanometers, then the density should be adjusted to assure phosphor particles within the 30 to 100 nanometer range, so that the beta particles will be captured before decay and thus generate photons.

One type of phosphor which may be utilized in the present invention is europium (Eu) activated $Y_2O^3$. Europium has a fairly sharp emission line at about 611 nm. Photons generated by europium have energy at wavelengths proximate the red visible wavelength, and the photovoltaic 34 is doped to have a peak response just below that wavelength.

Having optimized the individual elements and their relationship as described in detail above, and having configured the electrodes 24, 26 on the semiconductor layer 22 for the needed transparency, in accordance with the invention the preferred flexible nuclear battery is then mechanically configured to further maximize cell efficiency. As illustrated in FIGS. 2*c* & 2*d*, the partly formed battery is tightly rolled into a cylinder to achieve a configuration intended to maximize capture of generated photons. Since it is not possible to control the direction of travel of the generated photons, the battery is configured as a multiple layer roll, such that the majority of the photons have a direct path to some portion of the photovoltaic 34 no matter what their direction of travel. This arrangement minimizes the number of photons lost without capture by the photovoltaic, and thus enhances the capture efficiency and the overall efficiency of the battery 10. In order to further enhance efficiency, the electrode 24 positioned farthest from the photon generating layer is configured as a reflective electrode such that any photons which completely penetrate the semiconductor layer 22 are reflected by the electrode 24 for a further pass through the semiconductor and possible capture. Production of a reflective electrode 24 is readily accomplished by utilizing a thin film aluminum layer as the electrode, a thin film which is naturally reflective.

In certain instances it may be desirable to configure a battery with a photon generator on either side of the photovoltaic layer, and that configuration is illustrated in FIG. 3. FIG. 3 can thus be considered a dual-sided battery which includes a second layer 28', containing a beta source and phosphor. The layer 28' serves as a second photon generator, and is deposited on the undersurface of the substrate 20. As with the layer 28, the internal radioactive source generates betas which are captured by the phosphor which in turn generates photons. The photons travel through the transparent substrate 20 and the electrode 24, which is also configured for transparency, to create electron/hole pairs in semiconductor 22 for producing an electrical current.

Whether the single or dual sided configuration is utilized, it is preferred to tightly roll the layered battery device in a cylinder as illustrated in FIG. 1. In the single sided case, it is preferable to configure the electrode 24 to provide a reflecting surface to reflect any photons which impinge on it back through the semiconductor layer 22. Two reflective paths are worthy of note. The first path is traversed by the electrons which completely penetrate the semiconductor layer 22 without capture; those are reflected directly back into the semiconductor layer for a further pass through that material. The other path for capture are photons generated in the layer 28 which are directed away from the semiconductor layer through the substrate of the next innermost wrap of the multiple layer roll, and are reflected by the electrode 24 in that subsequent layer back to the layer which had originally generated the photon. The electrode 24 is easily fabricated in a reflective embodiment by use of thin film aluminum deposited on the substrate which serves both as an electrode and a reflector. It will be appreciated that if electrode 24 is configured as transparent, reflection back to the generating layer need not be required, and any photons generated in a given layer which penetrates into the next layer can be captured by the photovoltaic of that layer.

While the battery 10 is not expected to power devices requiring substantial power consumption, it is capable of powering devices for very long periods of time. The 12.5 year half-life of tritium suggests that the battery 10 should be capable of providing useful power for at least that long, since the beta source will be the major deteriorating component in the battery. The photovoltaic 34 should not be significantly damaged by the low-energy betas, and thus will continue to provide use 1 current output for the life of the beta emitter. When a low level radioactive source such as tritium is utilized, there is little danger of radioactive injury because of the very short travel distance of the emitted radioactive particles, on the order of 100 monolayers. Thus, shielding is not a problem for the battery in its application, nor is the radioactivity of the long-life source a problem during battery manufacture.

While the preferred embodiment has utilized a beta source/phosphor material intermixed in a gel for forming the first energy conversion layer, other techniques can be utilized in certain circumstances for closely associating the phosphor and the beta source. For example, particularly in the case where the energy level of the beta source is somewhat higher than that of tritium, the phosphor and beta source layers can be separate but closely associated, as can be accomplished by utilization of thin film deposition techniques for separately applying layers. More particularly, a phosphor layer is formed over the upper electrode of the photovoltaic as by sputtering, following which a subsequent thin film of beta emitter material sputtered in place over the phosphor. Use of such thin film deposition techniques produces such close adherence and association between the respective films that a reasonably high beta capture efficiency can be achieved in this embodiment in many cases.

Figure 4:
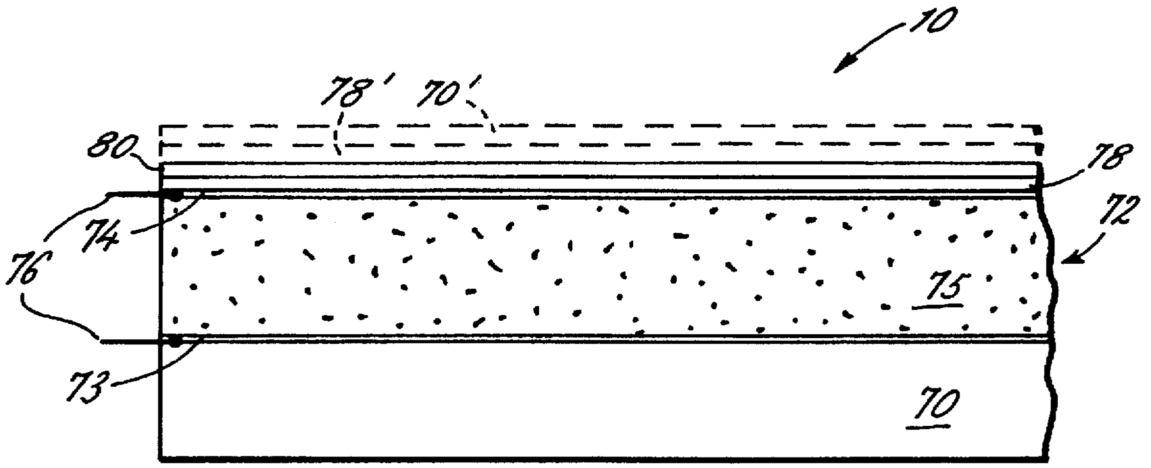
FIG. 4 is a view similar to FIG. 3 illustrating a further embodiment of the present invention in which the beta source and phosphor are deposited as separate thin film layers.

FIG. 4 illustrates an alternative embodiment of the invention which differs from the other embodiments in the means for associating the beta emitter with the phosphor. In the FIG. 2*a*–2*d* embodiment, for example, the phosphor and beta emitter were associated by a gel which married the two. In the FIG. 4 embodiment, separate layers of phosphor and beta source are deposited in such a way that they interact in accordance with the invention.

More particularly, FIG. 4 shows a flexible substrate 70 having a photovoltaic 72 disposed thereon. As in the prior embodiment, the photovoltaic 72 includes a lower electrode 73, an upper electrode 74, and a semiconductor layer 75 which converts incident photons into electron/hole pairs for generating an electrical output. The output appears on output leads 76.

In practicing the present embodiment of the invention, a relatively thin phosphor layer 78 is deposited on the upper surface of the transparent electrode 74, and a thin film beta source layer 80 deposited directly over the phosphor layer 78. Thin film deposition techniques, preferably sputtering, are used for deposition of the layers 78, 80, to maximize the contact in the interface between the layers 78, 80 in order to meet the proximity requirements needed for capture of the betas before decay. In implementing the FIG. 4 embodiment, it may be desirable in many cases to use a beta emitter which has a somewhat higher energy level than the tritium preferred for the earlier embodiment, while still approximating the "low energy" requirements of the invention, i.e., a beta source having an energy level of about 20 keV.

FIG. 4 further illustrates subsequent pairs of layers 78', 80' of phosphor and beta source material, respectively indicating that multiple very thin layers of the materials can be deposited in order to closely associate the beta source with the phosphor while providing an adequate mass of beta source material to produce a useful level of output energy. The FIG. 4 embodiment, having been formed on a flexible substrate 70 can be rolled to maximize photon capture, as described in connection with the previous embodiments.

The rolled configuration described in connection with FIGS. 2*a*–2*d* represents the currently preferred practice of the present invention. However, in certain circumstances many of the advantages of the invention can be achieved in a particular application where it is desired to provide a very low power long-life cell directed on a semiconductor substrate with the electronic components which it is to power. Such an application may be, for example, a long-life power source formed directly on a semiconductor substrate which carries a dynamic semiconductor memory, to provide a continuous power source so that the information stored in the memory is never lost due to loss of power. In this application, advantage is taken of the low energy beta source and closely juxtaposed phosphor, and of the close matching of the spectral response of the beta/phosphor combination with the photovoltaic. However, in order to fabricate the cell directly on the semiconductor substrate in which the memory is formed, the rolled configuration is dispensed with, perhaps at a cost in efficiency. However, a cell of dimension suitable for powering the memory is achievable on a semiconductor substrate without extensive exaggeration of the size of the completed device.

Figure 5:
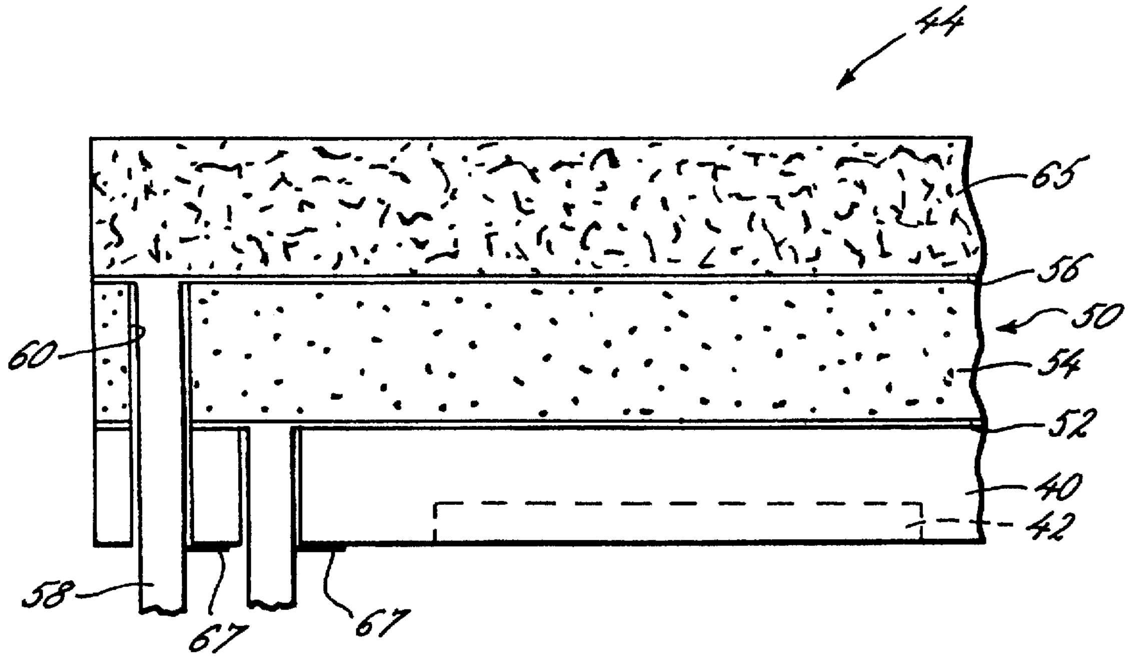
FIG. 5 is a side view of another embodiment of the present invention.

A semiconductor device with integral long-life battery exemplifying the present invention is illustrated in FIG. 5. There is shown a side elevation in cross section of a semiconductor device based on a substrate 40 having an active semiconductor such as a memory illustrated generally at 42 and carrying its own self-contained long-life battery source generally indicated at 44. It is not believed necessary to illustrate or describe any of the details of the semiconductor device 42, since it can be conventional and the invention can be applied with many conventional semiconductors. The intent of FIG. 4 is simply to illustrate a semiconductor substrate 40, which can be on elemental semiconductor such as silicon or a compound semiconductor such as gallium arsenide, carrying conventional active devices 42, and processed in accordance with the invention to include a self-contained long-life battery.

The battery is formed in a manner similar to the steps illustrated in connection with FIGS. 2*a*–2*d* except that in appropriate circumstances the polyimide substrate can be eliminated, and the semiconductor substrate 40 used in its place. It may be useful to deposit a thin layer of insulating material such as silicon dioxide, silicon nitride or the like over the rear surface of the semiconductor substrate 40 before beginning construction of the battery, in order to minimize leakage through the device.

As in the prior embodiments, a first electrode 52 is deposited on the substrate 50 as by sputtering. An aluminum electrode is preferred in this configuration. The photovoltaic 50 is then further configured by depositing a semiconductor layer 54 which serves as the photoreceptor and the converter of photons to electrical current. It is currently preferred to utilize a doped amorphous silicon as described above in order to provide the spectral characteristics matched to the spectral characteristics of a useful phosphor. Having formed a p-n junction in the semiconductor layer 54, an upper electrode 56 is then formed as by use of sputtering techniques.

It is noted that in the semiconductor application, electrical contacts to the semiconductor circuit 42 can be provided by leadout wires as described in the prior embodiment. In an alternate embodiment, a pair of through-connectors 58 are provided which are formed through apertures 60 penetrating the photovoltaic 50 and the semiconductor substrate 40 to terminate in conductive patterns 62 on the lower surface of the semiconductor substrate 40. The via connections 58 from electrical contact with the respective electrodes 52, 56, but pass through the materials in an insulated fashion to carry the power generated by the battery to the circuit 42 where it is consumed.

Having formed the photovoltaic 50, a beta source/phosphor layer is then deposited over the photovoltaic as described in connection with FIG. 2*b*. The layer is illustrated in FIG. 4 at 65 and serves both as the source of energy (low energy betas) and the first conversion means which converts the betas to photons for capture in the photovoltaic 50. The details of the materials and process techniques utilized are substantially the same as those described above.

The embodiment of FIG. 5 enables a microelectronic circuit to be self-powered without significantly increasing the dimensions of the microelectronic circuit. The battery 44 is capable of generating about 10–30 microwatts per square inch. At an estimated 15% efficiency, that is 1.5–4.5 microwatts/square inch output, which is enough to power a low-current microelectronic circuit requiring a compact, long-life, low-energy power source. An example of such a device is a very compact computing device having a battery-powered nonvolatile memory. Furthermore, the nuclear battery may be formed into a variety of planar configurations in order to adapt to the utilized environment.

FIG. 5 is also representative of a further embodiment of the invention, also of the type in which a long life battery is deposited on the same substrate which carries the electronic circuitry to be powered. In this case, however, the substrate 40 is not a crystalline semiconductor substrate, but a polyimide substrate, not unlike the substrate of the FIG. 1 embodiment. Such a substrate is useful in connection with amorphous silicon semiconductor devices, such as those used for large neural networks. Thus, in this embodiment of the invention, the substrate 40, in the form of a flexible polyimide substrate, has deposited thereon polycrystalline amorphous semiconductor circuitry, such as a large neural network, and in addition thereto, and for powering thereof, a photovoltaic layer 50 and light emitting layer 65 constructed as in accordance with the invention to produce power for the semiconductor device.

What is claimed is:

1. A nuclear battery, comprising in combination:

a flexible, dimensionally stable substrate;

photovoltaic means deposited on the substrate and having electrodes sandwiching a polycrystalline amorphous silicon semiconductor, at least one of the electrodes being transparent, the semiconductor being adapted to provide the photovoltaic means with a spectral response having a maximum at a predetermined wavelength;

a phosphor-bearing radioactive gel cast on the transparent electrode of the photovoltaic mean, the phosphor being in the form of fine particles of 1 less than 1 μm dispersed in the gel and having an emission peak at about the predetermined wavelength associated with the photovoltaic;

the radioactive gel containing a beta source emitting betas in the range of 20 kev or less and having a travel distance in the gel of 100 nm or less before decay;

the phosphor being adequately dispersed in the gel so as to capture the emitted betas before decay; and the substrate with the deposited photovoltaic means and the gel being rolled into a multiple layer cylindrical configuration to maximize capture of emitted photons in the photovoltaic means.

2. A method of forming a nuclear battery comprising the steps of:

providing a flexible dimensionally stable substrate;

depositing a pair of thin film electrodes sandwiching a polycrystalline active layer on the substrate to form a photovoltaic layer;

configuring the active layer of the photovoltaic layer to have a spectral response having a maximum at a predetermined wavelength;

mixing phosphor particles of 1 less than 11 μm in size in a radioactive gel to thoroughly disperse the particles and casting gel to form a layer of between about 0.5 and 1 mm in thickness on the photovoltaic layer, the gel containing a radioactive source of low energy beta particles having an energy level of 20 kev or less, distributing the phosphor in the gel before casting to provide sufficient proximity of phosphor to beta source to capture the betas before decay; and rolling the substrate carrying the photovoltaic layer and radioactive phosphor-baring gel into a multiple layer cylinder adapted to maximize photon capture in the photovoltaic layer.

* * * * *